Figure 1:
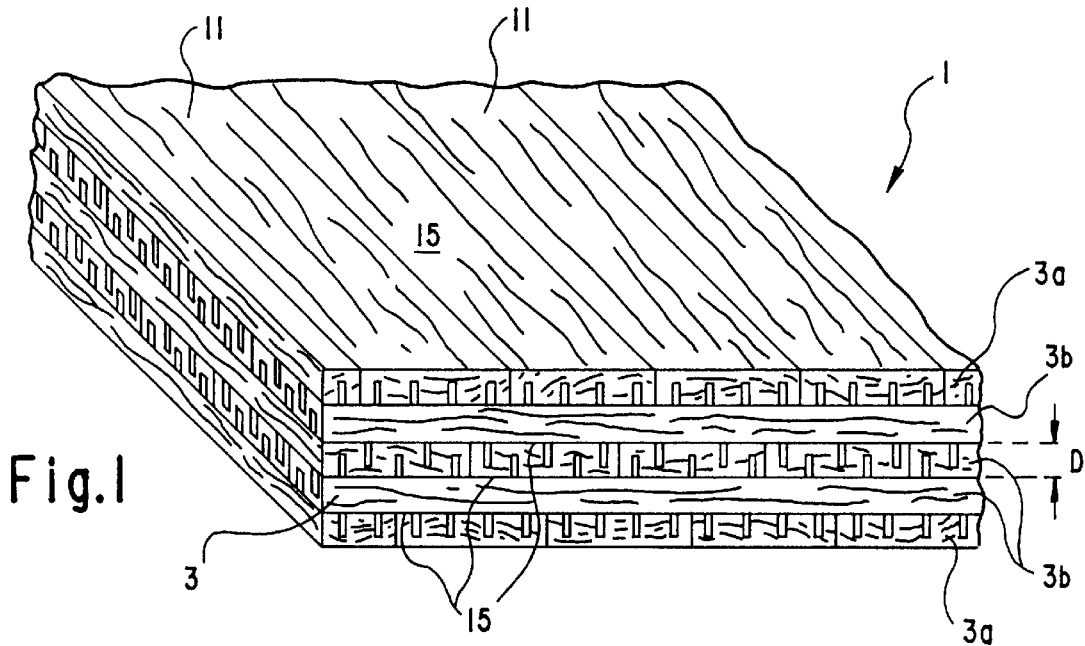

United States Patent [19]
Moser

[11] Patent Number: 6,106,655
[45] Date of Patent: Aug. 22, 2000

[54] VACUUM-BONDED LAMINATED WOOD PANEL

[75] Inventor: Karl Moser, Industriestrasse 2, D-86551 Aichach, Germany

[73] Assignee: Karl Moser, Germany

[21] Appl. No.: 09/117,536

[22] PCT Filed: Feb. 6, 1997

[86] PCT No.: PCT/EP97/00546

§ 371 Date: Aug. 4, 1998

§ 102(e) Date: Aug. 4, 1998

[87] PCT Pub. No.: WO97/28961

PCT Pub. Date: Aug. 14, 1997

[30] Foreign Application Priority Data

Feb. 7, 1996 [DE] Germany .............. 196 04 433

[51] Int. Cl.[7] .................................... B32B 31/00
[52] U.S. Cl. ................ 156/285; 156/382; 156/87; 428/105; 428/106; 428/107; 428/114
[58] Field of Search .................... 156/285, 286, 156/382, 87; 428/105, 106, 107, 114

[56] References Cited

U.S. PATENT DOCUMENTS

| | | | |
|---|---|---|---|
| 2,307,985 | 1/1943 | Beasecker | 156/285 |
| 2,661,511 | 12/1953 | Weyerhaeuser | 52/561 |

FOREIGN PATENT DOCUMENTS

| | | |
|---|---|---|
| 397 489 | 4/1994 | Austria . |
| 931 005 | 7/1955 | Germany . |
| 28 30 938 | 1/1980 | Germany . |
| 94 08 382 | 8/1994 | Germany . |
| 193 552 | 10/1937 | Switzerland . |
| 822 369 | 10/1959 | United Kingdom . |
| 2 260 934 | 5/1993 | United Kingdom . |

OTHER PUBLICATIONS

International Publication No. WO 95/32082 published Nov. 30, 1995.

*Primary Examiner*—Francis J. Lorin
*Attorney, Agent, or Firm*—Arent FoxKintner Plotkin Kahn PLLC

[57] ABSTRACT

The invention proposes a lamellar wood panel (1) comprising stacked, flatly superposed wood layers (3) cemented to each other at pairwise adjacent large faces (15), part of the wood layers (3) having mutually transverse fiber direction, part of the large surfaces (15) being fitted with a plurality of slots whereby the slots of the adjacent large surfaces (15) are mutually crossing, at least in part, pairwise adjacent wood layers (3) having mutually transverse fiber directions.

The invention also proposes a method for manufacturing a lamellar wood panel (1) in which wood layers (3) are stacked together and cemented to each other, at least part of the wood layers (3) with mutually transverse fiber directions being stacked, slots being fitted in part of the wood-layer large surfaces (15), the wood layers (3) being stacked, and the wood stack being moved into a tightly sealable enclosure which is evacuated during at least part of the cement setting period.

22 Claims, 1 Drawing Sheet

VACUUM-BONDED LAMINATED WOOD PANEL

DESCRIPTION

The invention relates to a lamellar wood panel, in particular a lamellar boards panel, further to a method for making a lamellar wood panel, in particular a lamellar boards panel.

Several wood lamellas, i.e. layers, are stacked on each other and bonded together to make lamellar wood panels. Depending on the cement used, most of the time it is necessary to keep the bonding joint, the space between the individual wood layers, as thin a possible to assure reliable and load-resistant bonding. As a rule, comparatively high compressions are required and applied by mechanical presses of clamping means such as screw clamps or the like to ensure the cement is uniformly distributed between the wood layers. Cement extruding at the edges of the bonding joint tells the expert the cement is being spread uniformly.

A new manufacturing procedure proposed in the non-prepublished German patent application P 44 27 365. 7 is advantageous especially on economic grounds as regards to large-format lamellar wood panels. In this procedure, the stacked wood layers are covered by an airtight foil wrap which is part of a tightly sealable enclosure, and said enclosure is evacuated at least during part of the cement setting period. Exploiting the ambient air pressure, this procedure eliminates the need for complex and costly presses. However, this procedure incurs the drawback that the most compression achieved to cement the wood layers at best equals atmospheric pressure unless further means are employed. As a result, the applied compression may be inadequate to uniformly spread the cement and form an adequately thin bonding joint.

Accordingly, it is the objective of the invention to create a lamellar wood panel of the above kind wherein the cement distribution is optimized.

Another objective of the invention is to offer a method of the kind described to manufacture such a lamellar wood panel which can be implemented using simple means.

The invention assumes a lamellar wood panel comprising a plurality of wood layers superposed flat on each other and bonded at contacting large faces over their surfaces, in particular over their full surfaces, with some of the contacting wood layers in mutually transverse directions, specifically in mutually perpendicular fiber directions.

At least part of the contacting and mutually bonded large faces in a lamellar wood panel are fitted each with a plurality of substantially parallel slots running essentially in the fiber direction in such manner that some of the slots on contacting wood layers with mutually transverse fiber directions cross the slots on the contacting wood layer.

The invention is based on the concept that cavities are subtended at the slots' crossing sites between the bonded wood layers, said slots acting as cement reservoirs during compression and thereby promoting uniform and laterally omnidirectional cement distribution. Because of the plurality of crossing sites distributed in the area of the bonding joint and the ensuing reservoirs, local cement accumulations during compression are precluded, and the enlargement of the bonding joint at such sites is similarly controlled.

Accordingly, a lamellar wood panel of this design is suitable for manufacturing procedures employing only modest compressions, in particular the above outlined vacuum cementing.

Bonding wood layers with equally thin bonds furthermore offers the advantage of saving cement and permits the use of more economic cements.

Because of its inherent properties, the lamellar board panel can be advantageously used as a wall component because it offers a high tightness to air, combined with a relatively low vapor diffusion impedance. The latter property is the consequence of high moisture transport rates along the intersecting slots such that humidity in the panel will quickly spread. This property is also caused by the increased ability for cross-panel diffusion, especially if the slots are fairly deep.

In regions undergoing comparatively large shear stresses, for instance where panels are stored, locally relatively large quantities of cement may be appropriately introduced locally to increase rigidity, said cement during compression then entering the slots, and following hardening providing pressure-resistant slot fillings.

The method of the invention is based on a procedure for making a lamellar wood panel. in particular a lamellar board panel, wherein a plurality of wood layers are flatly stacked on each other and are bonded together in pairwise adjacent surfaces across these surfaces, especially fully across them, at least some contacting wood layers being stacked with mutually transverse directions, specifically mutually perpendicular fiber directions.

In the method of the invention, some of the contacting faces of the wood layers comprise a plurality of nearly parallel slots running mainly in the fiber directions. These wood layers are stacked such that, the slots of some of the contacting wood layers in mutually transverse fiber directions, shall cross. The wood stack shall be covered with a tightly sealable enclosure which is evacuated during part of the cement's setting period.

The method can be implemented using simple means and in particular does not require a mechanical press.

The slots may be processed in one operation together with the planing of the wood layers, for instance by moving the wood layer through one processing station with planes, circular saws or milling equipment.

Compressing the wood layers using an airtight foil wrap is simple and especially advantageous if the lamellar wood panel shall serve as a construction component. In such an application, large-format lamellar wood panels can be fabricated on site from individual wood elements that are easily transported. Accordingly, shipping these panels, with lengths or widths of several meters and surfaces of roughly 100 $m^2$ is unnecessary.

Preferably, the lamellar wood panel of the invention shall comprise slots on both large faces at least in those wood layers that are covered on both sides by wood layers with mutually transverse fiber directions.

This feature offers the advantage of improving the cement distribution in all bonding joints of the lamellar wood panel.

The slots present on both large faces may be mutually staggered, especially in mutually halfway manner.

Alternatively, the slots present on both large faces also may run pairwise in the same cross-sectional plane.

In both cases the density of the slots on the opposite sides is the same and the material removed from the wood layer by making the slots is uniformly missing across the cross-section of this wood layer.

Moreover, at least one of the wood layers may be fitted with slots on only one of its large faces, and the depth of these slots shall be at least as deep as half the thickness of this wood layer.

Special purposes may warrant one large face without slots, i.e. for aesthetic purposes on a construction site when one large face is visible or if the slots were to hamper the deposition of a cover layer.

Together with their width, the depth of the slots affects the slots' efficacy as cement reservoirs and also the construction properties of the lamellar wood panel.

If slots are staggered on both large faces, these slots also may have a depth at least half the thickness of the wood layer.

If the slots present at both large faces run pairwise in the same cross-sectional plane, they also may optionally be of a depth at least one fourth the thickness of the wood layer.

The slots which are closely adjacent and face the opposite large faces enhance the diffusion ability of the wood layer further.

Manufacture of the lamellar wood panel of the invention is simplified when all wood layers are fitted with slots on both large faces.

An illustrative embodiment of the invention is elucidated below in relation to the drawing.

Figure 2A:
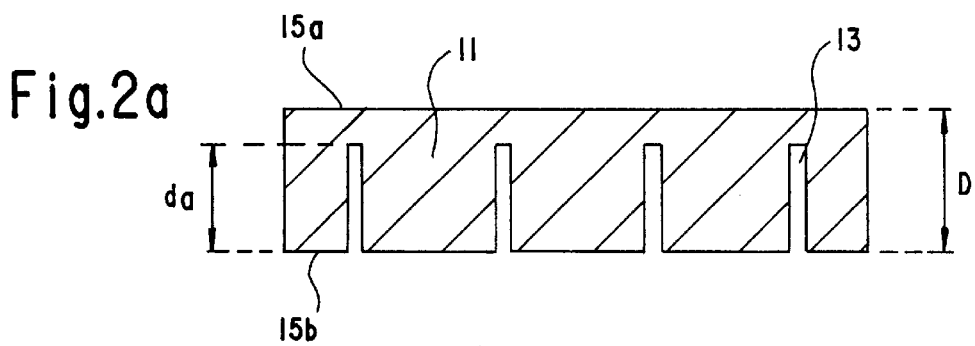
Figure 2B:
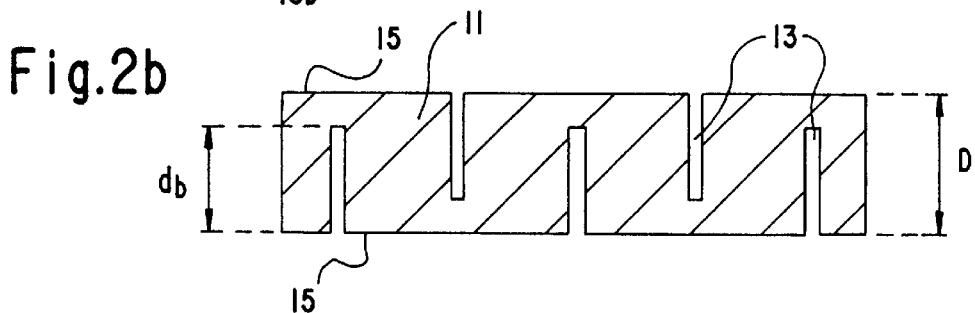
Figure 2C:
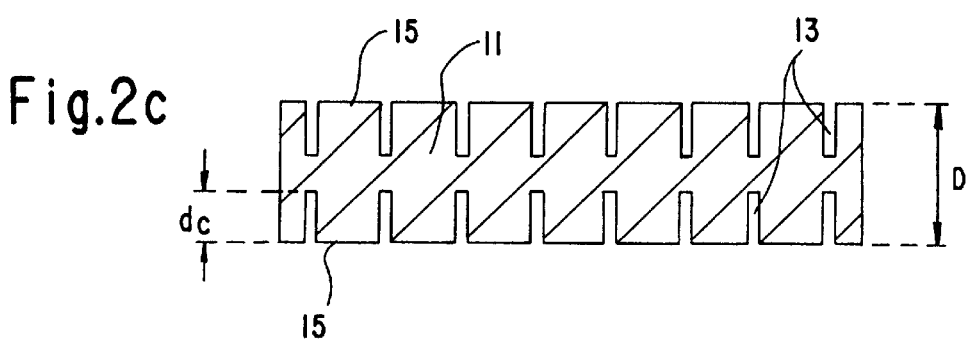

FIG. 1 is a perspective of a region of lamellar wood panel of the invention, and FIGS. 2a–2c are various cross-sections of individual wood layers of a lamellar board panel.

FIG. 1 shows a lamellar wood panel 1 comprising several wood layers 3 bonded to each other at pairwise adjacent large faces 15 over said sides' full surfaces. The wood layers 3 each comprise several wood elements in the form of boards 11 in which the wood fibers within a wood layer always run parallel. All pairwise adjacent wood layers have mutually perpendicular fiber directions. The pairwise adjacent and mutually bonded large faces 15 each are fitted with a plurality of parallel slots 13 running in the direction of the fibers whereby the slots 13 of the adjacent large faces 15 cross each other in the pairwise adjacent wood layers 3.

During the cementing of the individual wood layers 3, the cavities subtended by the slots 13 improve cement spreading and thereby contribute to forming thinner bonding joints; the mutually crossing slots improve omnidirectional distribution of the cement.

To implement this advantage for all bonding joints, and as shown in FIG. 1, the inner wood layers 3b, that is the wood layers which are covered on both sides by other wood layers must be fitted with slots 13 on their large faces 15, whereas the outer wood layers 3a need only have each their slots 13 on their inwardly pointing large faces.

In this embodiment the outer wood layers 3a are cross-sectionally as shown in FIG. 2a whereas the cross-section of the inner layers 3b is as shown in FIG. 2b.

FIG. 2a shows the cross-section of a wood layer 3 comprising slots 13 only in one of its large faces 15b whereas the opposite side 15a is without slots. The slots 13 are apart from one another by approximately 15 to 120 mm, preferably about 20 to 30 mm and their width is a few millimeters. Regarding the diffusive properties of the individual wood layers 3 and hence of the panel 1 as a whole, the slots 13 advantageously are a depth da which is larger than half the thickness D of this wood layer. In order not to excessively degrade the mechanical strength of the individual wood layers 3 or of the boards 11 by the slots 13, a depth from 0.5 to 0.8 times the thickness is recommended. The machining of the slots is substantially simplified if they are straight. Even though the slots 13 are not mandatorily equidistant, such a configuration however offers an especially regular slot distribution.

FIG. 2b is a cross-section of a wood layer 3 fitted with slots 13 on both sides. The slots 13 present in both large faces 15 being centrally offset relative to one another. This slot offset also allows a slot depth db larger than half the thickness D of the wood layer 3.

FIG. 2c shows a variation of the wood layer of FIG. 2b. Thereby the slots 13 present at both large faces 15 also may run pairwise in the same cross-sectional plane. In this case the slot depth $d_c$ is less than half the thickness D.

The method of the invention to manufacture a lamellar wood panel 1 may be implemented in the following manner:

The wood elements used to form the individual wood layers 3 such as panels or boards 11 move through a planing machine to coarsely eliminate the roughnesses of these elements.

Concurrent with planing, substantially parallel slots 13 are machined in some of the wood elements essentially in the fiber direction. These slots may be milled, or in the case of straight slots, sawed into the wood.

The wood elements used for an outer wood layer 3a are placed in a vat while being laterally abutting, and, depending on the planned format of the lamellar wood panel 1 the wood elements also may be made to abut in two directions.

Preferably in automated manner, cement is then deposited on the surface of said first wood layer 3a, and the next wood layer 3b is formed by depositing further wood elements on the cement-covered large face 15 of the first layer 3a. Where called for, the latter two steps are repeated several times until the wood stack comprises a predetermined number of wood layers 3 and finally is completed by a cover layer in the form of a second external wood layer 3a.

In order to ensure that sine of the slots 13 of the contacting faces cross each other, the fiber direction of the wood layers is changed several times during stacking.

This manner of stacking increases the mechanical load-bearing capacity of the final lamellar wood panel 1 because of the rigidifying effect of the omnidirectional tensile strength. Furthermore, the mutually crossing slots subtend cavities uniformly distributed over the cement joint and subsequently serve as cement reservoirs when the wood layers are compressed, thus improving cement distribution and precluding local cement accumulations.

The preparations for the ensuing compression comprise covering the vat holding the wood stack by means of an airtight sheet wrap so that this wrap together with the tub shall form a hermetically sealable enclosure. The required compression then is easily generated by evacuating the enclosure during part of the cement's setting period.

In some of the wood-layer large faces 15, the slots 13 furthermore offer an advantageous effect during compression in that small roughnesses or warps of the boards 11 will be better compensated.

Because of the simple and economical means used, the method of the invention is especially well suited in the manufacture of lamellar wood panels at their site of use, for instance at a construction site. In this case the boards 11 already may have been delivered prefinished, that is planed and fitted with slots.

In an alternative to the above described method, the cement also may be deposited first on the boards 11 which then shall be stacked.

The method of the invention is simplified by providing the slots 13 on all the wood-layer large faces 15. In such a case planing the boards 11 and machining the slots 13 can be carried out in identical manner for all boards, and uniform boards will then be available to build the stack, said boards being stackable without having to distinguish between inner and outer boards, regardless of their orientations.

Lastly, it will be appreciated that a wood stack with a sealable enclosure also can be placed inside a overpressure container for its compression, a compensating line to the atmosphere being connected to the enclosure. A pressure on the order of 10 bars is easily generated by filling the overpressure container with a pressurized fluid, for example compressed air.

What is claimed is:

1. A method for manufacturing a plate-like construction component for a building wherein a plurality of wood layers are stacked flat on each other and are cemented together by the surfaces, in particular the full surfaces of the pairwise adjacent large faces, at least some pairwise adjacent wood layers, which have mutually transverse, in particular perpendicular fiber directions being stacked, a plurality of approximately mutually parallel slots running essentially in the fiber direction are machined into at least in each of a part of the wood-layer large faces, the slots run essentially in the fiber direction and approximately mutually parallel at a mutual spacing of about 15 to 200 mm, the wood layers are stacked in such manner that the slots of the adjacent large faces are mutually crossing in at least a part of the pairwise adjacent and stacked wood layers running transversely to each other and in the fiber directions, and the wood stack is covered by an airtight foil wrap which is a component of a sealable enclosure that is evacuated at least during a part of the cement setting period.

2. Method for manufacturing a plate-like construction component as claimed in claim 1, wherein the slots are machined at both large surfaces into the wood layers stacked between the wood layers having a transverse fiber direction.

3. Method for manufacturing a plate-like construction component as claimed in claim 2, wherein the slots in both large faces are mutually offset, in particular being centrally staggered relative to each other.

4. Method for manufacturing a plate-like construction component as claimed in claim 2, wherein the slots present in both large faces are machined to run pairwise in the same cross-sectional plane.

5. Method for manufacturing a plate-like construction component as claimed in claim 1, wherein the slots are machined into at least one of the wood layers solely in one of its large faces and in that the depth of these slots is at least half the thickness of this wood layer, in particular in the range of 0.5 to 0.8 the thickness.

6. Method for manufacturing a plate-like construction component as claimed in claim 3, wherein the slots are present in at least one of the wood layers in both its large faces and in that the depth of these slots is at least half the thickness of the wood layer, in particular in the range of 0.5 to 0.8 the thickness.

7. Method for manufacturing a plate-like construction component as claimed in claim 4, wherein the at least one of the wood layers is fitted with slots in its large faces and in that the depth of these slots is at least one-fourth the thickness of this wood layer, in particular in the range of 0.25 to 0.4 the thickness.

8. Method for manufacturing a plate-like construction component as claimed in claim 1, wherein the slots are fitted in at least part of the wood layers only into one of their large surfaces and in that these wood layers shall form at least the outer wood layers during stacking, in particular in such manner that the large faces fitted with slots of the outer wood layers are pointing inward.

9. Method for manufacturing a plate-like construction component as claimed in claim 1, wherein the slots are fitted in at least part of the wood layers into both the large faces and in that during stacking the wood layers shall form at least the inner wood layers.

10. Method for manufacturing a plate-like construction component as claimed in claim 1, wherein the slots are fitted in all wood layers into both their large faces.

11. Method for manufacturing a plate-like construction component as claimed in claim 1, wherein said slots are fitted into one large face at a mutual spacing of approximately 20 to 30 mm.

12. Method as claimed in claim 1, wherein the wood stack with the sealable enclosure also is placed inside a overpressure container for compression.

13. Method as claimed in claim 1, wherein the slots are processed in one operation together with a planing of the wood layers.

14. Method as claimed in claim 1, wherein the wood layers are compressed at the site of use of the construction component.

15. Method as claimed in claim 14, wherein wood elements provided for forming the wood layers are transported to the site of use.

16. Method as claimed in claim 15, wherein the wood elements are formed from boards.

17. Method as claimed in claim 15, wherein the wood elements are formed from boards which are planed and fitted with slots.

18. Method as claimed in claim 16, wherein the wood elements are formed from boards which are planed and fitted with slots.

19. Method as claimed in claim 1, wherein a cover layer is deposited, after the compression, on the construction component.

20. Plate-like construction component for a building, characterized in that it is manufactured by a method as claimed in one of claims 1 through 19.

21. Plate-like construction component as claimed in claim 20, wherein said component is provided for use as a wall element.

22. A method for manufacturing a plate-like construction component for a building, comprising:

providing a plurality of large boards, each board being a wood layer, each layer having large faces with surfaces and fiber direction;

machining a plurality of approximately mutually parallel slots running essentially in the fiber direction into at least a part of each of the wood-layer large faces;

stacking the plurality of wood layers flat on each other, each layer having large faces with surfaces and fiber directions, at least some pairwise adjacent wood layers being stacked with mutually transverse fiber directions;

cementing the full surfaces of pairwise adjacent large faces of the wood layers together;

wherein the slots run essentially in the fiber direction and approximately mutually parallel at a mutual spacing of about 15 to 200 mm, the wood layers being stacked in such manner that the slots of the adjacent large faces are mutually crossing in at least a part of the pairwise adjacent and stacked wood layers running transversely to each other and in the fiber directions;

wrapping the stacked wood layers with an airtight foil wrap to form a sealable enclosure; and evacuating the sealable enclosure at least during a part of a cement setting period.

* * * * *